Feb. 11, 1969    J. ARONSTEIN ET AL    3,426,883
VIBRATORY FEEDING AND ORIENTING APPARATUS
Filed July 28, 1967

INVENTORS
JESSE ARONSTEIN
DONALD T. MOZER
STANLEY J. POLONCIC

BY
ATTORNEY

United States Patent Office 3,426,883
Patented Feb. 11, 1969

3,426,883
VIBRATORY FEEDING AND ORIENTING APPARATUS
Jesse Aronstein, Latham, Donald T. Mozer, Chelsea, and Stanley J. Poloncic, Wappingers Falls, N.Y., assignors to International Business Machines Corporation, Armonk N.Y., a corporation of New York
Filed July 28, 1967, Ser. No. 656,723
U.S. Cl. 198—33
Int. Cl. B65g 47/24
22 Claims

ABSTRACT OF THE DISCLOSURE

Vibratory article feeding apparatus for the rotational orientation of an article having a polygonal surface and a group of projections from said surface having a peripheral polygonal configuration which is asymmetrical with the surface configuration such as semiconductor chips with a rectangular surface configuration and a triangular configuration of contact projections. In a vibratory feeder bowl having a spiral track up which the articles are fed in an initial random rotational orientation in the surface plane, a series of projection-engaging guide means respectively rotate only articles having specific orientations to bring all of the articles into a preselected rotational orientation.

BACKGROUND OF INVENTION

Field of invention

This invention relates to vibratory feeding apparatus. Such apparatus conventionally includes a vibratory feeder bowl having a hopper source, usually centrally located, containing articles piled in a random or jumbled array. The bowl has an inclined elevating spiral track extending from the hopper source around the periphery of the bowl. The bowl is vibrated by an associated electromagnetic vibratory motor to cause the articles to serially move up the track to a receiving station at the end of the track.

Description of prior art

Vibratory feeding apparatus which deliver articles in a uniform orientation are known in the prior art. However, in general, such apparatus operates by feeding a series of randomly oriented articles to the track and rejecting or recycling misoriented articles from the track back into the hopper. Such apparatus does not operate at conditions approaching maximum efficiency and speed because, dependent on the number of possible orientations of the particular article, an article may be recycled one or more times. This may cause gaps in the delivery of articles by the vibratory apparatus, particularly when only a small number of articles remains in the hopper.

While the art has developed vibratory feed apparatus for orientating specific articles on track without the rejection and recycling of misoriented articles, e.g. as set forth in U.S. Patent 2,725,971, there appears to be no existing apparatus capable of rotationally orienting structures such as semiconductor chips having a flat polygonal supporting surface and a group of projections from said surface having a peripheral polygonal configuration which is asymmetrical with the surface configuration. One such semiconductor chip has a rectangular surface configuration and a group of three projections from the surface having a triangular configuration. With respect to this triangular configuration, the base may be said to be adjacent one edge of the rectangular chip designated the bottom edge, the two legs of the triangle respectively adjacent side edges of the chip and apex of the triangle adjacent to the top edge of the chip. Such a chip has four possible rotational orientations in the plane of the surface. In order for the chip to be properly placed on a ceramic module with the projections contacting the correct conductive lands on the substrate, the feeder apparatus must deliver the chip to the placement stations in the preselected one of the four possible rotational orientations. In addition, apparatus for testing the electrical characteristic of semiconductor chips requires that such chips be delivered in a definite rotational orientation. The existing vibratory bowl apparatus for accomplishing such an orientation utilizes the previously described principle of rejecting and recycling misoriented chips as disclosed in the publication by T. Ross, "Orientation of Semiconductor Devices with Ball-Type Terminals" appearing at p. 718, "IBM Technical Disclosure Bulletin," vol. 7, No. 8.

SUMMARY OF INVENTION

The present invention provides improved vibratory article feeder apparatus for the rotational orientation of articles each of which has a planar surface from which surface a group of at least three projections extends. The peripheral projections in the group form a convex polygon. The polygon is asymmetrical with respect to the edge of the surface. That is each of the sides of the polygon has a disposition with respect to the surface edge different from that of any other side. The articles are oriented to a preselected rotational orientation in the plane of the surface without the rejection and recycling of any articles which do not have the preselected rotational orientation.

While the description of the present invention emphasizes apparatus for the rotational orientation of semiconductor chips having a group of contact projections in one polygonal peripheral configuration extending from a face having another polygonal configuration, it will be clear that the principles of operation will apply to apparatus for rotationally orienting other articles having a group of projections from one planar face thereof.

A series of guide means or ridges is provided along the track in the vibratory feeding bowl for successively engaging gravitationally peripheral members of the group of projections or ball contacts on the chip. Since the chips are initially randomly piled in the center of the vibratory bowl, preliminary means are provided for disposing the chips onto the track with their projection bearing surfaces facing and gravitationally engaging the inclined track up which the chip is climbing. That is the chips are fed to the track in a "balls-down" or contacts-down array. The chips being thus moved up the track have a random rotational orientation in the plane of the surface from which they extend. The first guide means gravitationally engage the closest peripheral side of the polygon formed by the contact projections on the chip. Assuming the polygon has $n$ sides, the chip is capable of $n$ rotational orientations dependent upon which side is in contact with the guide means. There are $(n-1)$ guide means or ridges. Each of the guide means in the series is so arranged as to rotate for one turn only chips requiring a number of turns to reach the preselected orientation equal to the number of guide means (including the one engaging the chip) remaining in the article path along the track. The chips are turned or rotated in the plane of the surface. One turn may be described as the distance the chip must be rotated to bring a succeeding polygon side into the rotational orientation of its preceding side, e.g., where the polygon is a triangle and a given side of the triangle is lowermost in a random orientation, a rotation of one turn will bring the next side into the lowermost position. Because each side of the projection polygon has a unique disposition with respect to the edge of the face or surface, each guide means may be constructed and arranged to selectively turn only chips or articles, the random orientation of the sides of which is indicative of a chip needing the requisite number of turns for the particular guide means station in the series. All other chips are guided through the station unturned.

The individual guide ridge means utilize the inertia of the moving chip and gravity to rotate or turn the chip, as by pivoting or tumbling, in the same sense as the movement of the chip up the track.

In accordance with another aspect of the present invention, novel guide ridge means are provided for selectively turning chips and other articles having faces with polygonal edges of one configuration from which a group of projections extends in a non-uniform configuration with respect to the surface edges. The chips are moved along the track with one edge of the polygonal face gravitationally engaging the track. The ridge on the feeder bowl track engages at least two of the projections on the chip which are closest to the ridge in the random rotational orientation of the chip moving up the track. The guide means guide the chip past an operatively associated abutment on the track. The abutment is positioned so as to pivotally engage the surface edges of only chips having rotational orientations in which the projections contacted by the ridge have a preselected disposition with respect to the polygonal surface edge whereby the motion of the chip acts to rotate the article in the plane of the surface to an orientation in which the next succeeding side of the polygon engages the track.

Accordingly, it is the primary object of this invention to provide vibratory feeding apparatus for rotationally orienting semiconductor chips having a group of contacts projecting from a planar substrate, said orientation being in the plane of the substrate.

It is another object of this invention to so orient said chips without rejecting and recycling misoriented chips.

It is yet another object to so orient specific chips having a group of contacts in a triangular configuration and a substrate in a rectangular configuration.

It is a further object of this invention to provide vibratory feeding apparatus for rotationally orienting articles having a planar surface of one polygonal configuration and a group of projections from said surface in another polygonal configuration asymmetrical with the first configuration.

It is a further object of this invention to provide vibratory feeding apparatus having novel means for selectively rotating articles having a polygonal surface with a group of projections from the surface in non-uniform disposition with respect to the surface edge, said rotation being in the plane of the surface.

It is yet a further object of this invention to provide improved vibratory bowl feed apparatus for accomplishing the foregoing objects.

The foregoing and other objects, features and advantages of the invention will be more apparent from the following more particular description of preferred embodiments of the invention as illustrated in the accompanying drawings.

DESCRIPTION OF PREFERRED EMBODIMENTS

Figure 1:
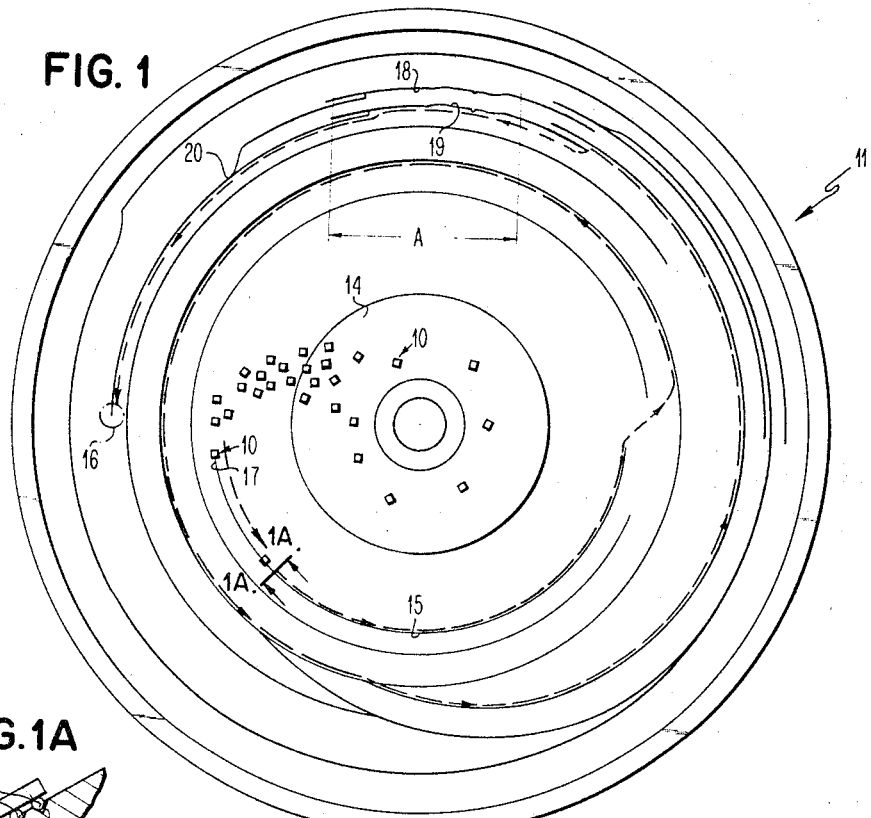
FIGURE 1 is a schematic plan view of a vibratory feeder bowl into which the improvement of this invention has been incorporated.
Figure 2A:
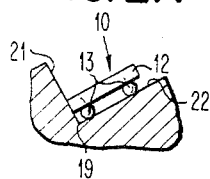
FIGURE 2A is an enlarged partial cross-sectional view along line 2A—2A of FIGURE 2.
Figure 2B:
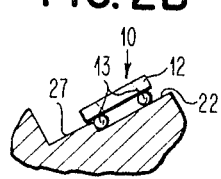
FIGURE 2B is an enlarged partial cross-sectional view along line 2B—2B of FIGURE 2.
Figure 2:
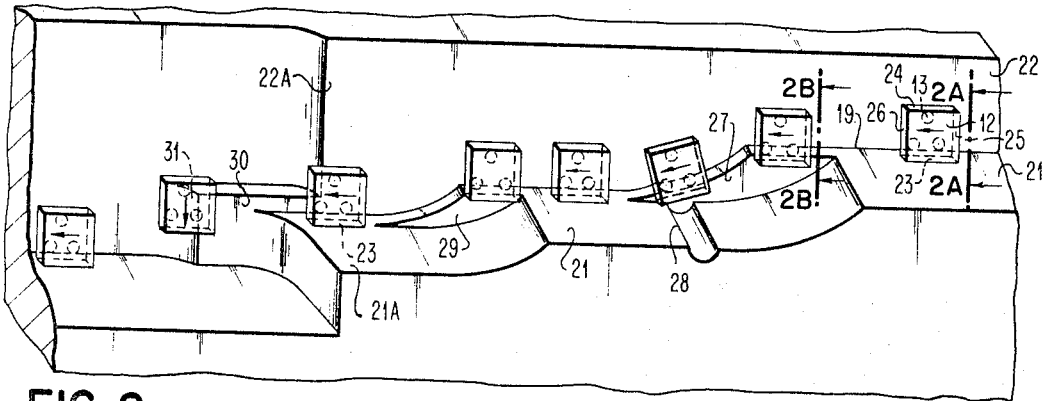
FIGURE 2 is an enlarged perspective view of one portion of track within the limits of section A in FIGURE 1 which is the improvement of the present invention incorporated into the track; a chip of a given initial rotational orientation is shown moving along the track.

Chips 10 having a configuration best shown in FIGURE 2 are loaded into the central hopper portion 14 of vibratory bowl 11 shown in FIGURE 1. The chips have a flat rectangular base 12 of semiconductor material from the bottom face of which three contact projections or balls 13 extend in a triangular arrangement.

Before considering the improvement of the present invention, the manner in which articles travel up the inclined elevated track of a conventional vibratory feeder bowl should be briefly described. The bowl is mounted on a vibratory actuating device (not shown) which vibrates the bowl in such a manner that it imparts a forward movement to the articles, which in the present case are chips, from the central hopper portion 14 of the bowl up the inclined track 15 along the inner periphery of the bowl in a counter-clockwise direction. The chips proceed up the track in a serial train to a delivery point such as at location 16 where the oriented chips are individually removed from the track by suitable means such as a vacuum probe. One path a chip may take is shown by the dotted line. The means for vibrating the bowl may be any conventional device for producing vibrations such as "Syntron" electromagnetic drive mechanisms in which an electromagnet energized by a pulse reciprocates the bowl to impart motion to the chips up the spiral track.

In the following description, one embodiment of apparatus incorporated into a vibratory feeder bowl for accomplishing rotational orientation of chips will be described in detail. Since conventional vibratory feeder bowls normally operate to provide a continuous sequential output of articles at a specified rate, it will be understood any of the known expedients for providing such a sequential output of chips may also be incorporated into the bowl having the improvement of this invention. Such expedients include structures for separating a train of articles on a single track into a plurality of parallel trains on parallel tracks and structures for merging such parallel trains back into a single train on a single track, "overfeed" control means for controlling the length of the line of articles awaiting pickup as well as means for checking for and rejecting defective articles or chips.

Figure 1A:
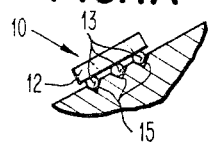
FIGURE 1A shows an enlarged partial section of the bowl track taken along line 1A—1A of FIGURE 1.

Referring to FIGURE 1, chips 10 are loaded into the central hopper 14 of bowl 11. The chips are disposed in this central hopper in random array. That is each chip may be in a "balls-up" or "balls-down" position as well as in a random rotational orientation. The central hopper is sloped so that the vibrations cause the chips to move toward the beginning of track 15 at point 17. The initial portion 17 of track 15 is provided with a plurality of parallel grooves which engage the balls of the chips as shown in FIGURE 1A. This provides only chips in a balls-down disposition on the track. The chips move up the track in the counter-clockwise direction shown by the arrow in a random rotational orientation. The orientation of the chips into a preselected rotational orientation is carried out along the track defined by section A in FIGURE 1. In order to maintain the flow of chips in the bowl at effective rates, the rotational orientation may be most conveniently carried out simultaneously along identical parallel track sections 18 and 19. The chips moving up spiral track 15 in a single train are separated into two trains moving respectively along parallel track sections 18 and 19. The chips are orientated along tracks 18 and 19 simultaneously after which track sections 18 and 19 again merge into a single track at point 20. The use of two parallel track sections for the orientation is a matter of choice and the rotational orientation will operate well on a single track section.

The rotational orientation will now be described with respect to FIGURES 2, 3 and 4 which show chips having different random rotational orientations moving along track section 19 in the direction indicated. As shown in FIGURE 2A, the chip 10 moves along track 19 with its edge in gravitational engagement with track wall 21 and its balls in gravitational engagement with track wall 22. For facility in describing the orientation of the chip, the side of the triangle formed by the balls of the chip which is parallel to an edge of the chip as shown in FIGURE 2 is to be considered the base of the triangle and the parallel chip edge will be referred to as the bottom edge 23 of the chip. It follows then that the top edge 24 of the chip is adjacent to the apex of the triangle, the right chip edge 25 is adjacent to the right leg of the triangle and the left chip edge 26 is adjacent to the left leg of the triangle.

The chip is to be oriented in a preselected orientation in which the base of ball triangle and bottom edge of the chip are lowermost. The chip entering the orientation sector in FIGURE 2 already has this orientation. The chip entering the orientation sector may have one of four random orientations: bottom edge 23 lowermost as in FIGURE 2, bottom edge 23 leading or bottom edge 23 uppermost as shown in FIGURE 3 or bottom edge 23 trailing as shown in FIGURE 4. As the chip proceeds forward, its balls forming one side of the triangle are gravitationally engaged by guide ridge 27 of the first orientation station (as shown also in FIGURE 2B). The triangle side engaged will be determined by the rotational orientation of the entering chip. With chips entering with bottom edge 23 lowermost, as shown in FIGURE 2, guide ridge 27 will engage the base of the triangle. In chips entering with bottom edge 23 uppermost or leading, as shown in FIGURE 3, the right leg of the triangle will be engaged by guide ridge 27. In chips entering with the bottom edge 23 trailing, as shown in FIGURE 4, the left leg of the triangle will be engaged by guide ridge 27.

The chips at the first orientation station thus have one of three orientations, each with a different triangle side engaging the ridge. As will hereinafter be described the first orientation station will rotate for one turn counterclockwise only chips requiring two turns to reach the preselected orientation, and the second orientation station will rotate for one turn only chips requiring one turn counterclockwise to reach the preselected orientation. One turn is the counterclockwise rotation required to bring the next side of the ball triangle into the rotational position now occupied by the triangle side engaged by the ridge. The triangle sides engaged by the ridge may also be considered as the lowermost sides. Thus, upon entering the first orientation station, the only chips which require two counterclockwise turns to reach the preselected orientation in which the base of the triangle gravitationally engages guide ridge 27 and is, therefore, lowermost are the chips with their left legs engaging guide ridge 27 as shown in FIGURE 4. Only these chips will be rotated for one turn at the first orientation station. Chips with their right legs engaging guide ridge 27, as shown in FIGURE 3, require only a single turn to reach the preselected orientation and will not be rotated at the first station. Such chips will be rotated at the second orientation station. Also, chips with their bases engaging guide ridge 27, as shown in FIGURE 2, will not be rotated since they are already in their preselected rotational orientations.

Figure 3:
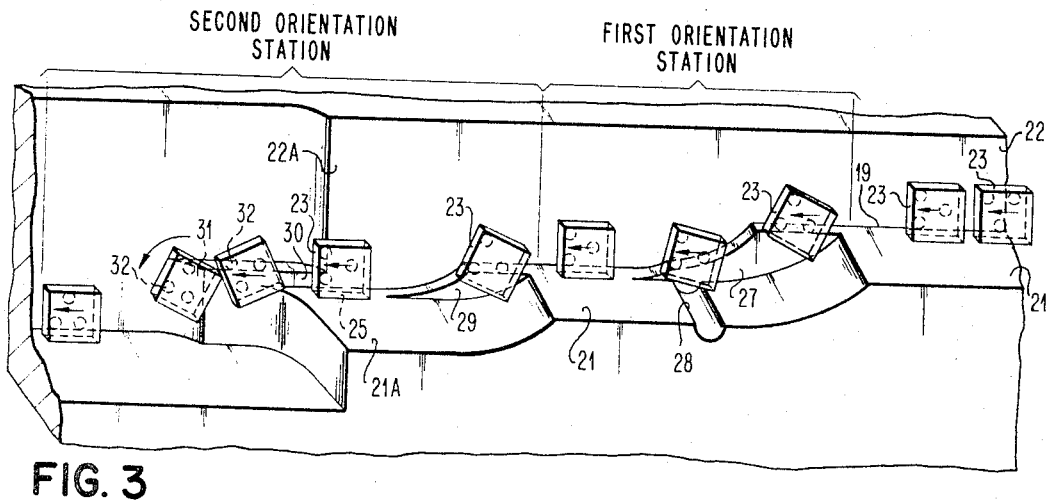
FIGURE 3 is the same view as FIGURE 2 except that a chip having an initial rotational orientation different from that of FIGURE 2 is shown moving along the track.

The chips engaging guide ridge 27 in the orientations shown in FIGURES 2 and 3 are guided by the ridge over abutment 28 and then again move along in gravitational engagement with track walls 21 and 22 to be reengaged by guide ridge 29 of the second orientation station in the same rotational orientation which they respectively had at guide ridge 27. That is in chips where the triangle bases gravitationally engaged guide ridge 27, the bases now engage guide ridge 29, and in chips where the right triangle legs engaged guide ridge 27, the right legs now engage guide ridge 29.

Figure 5:
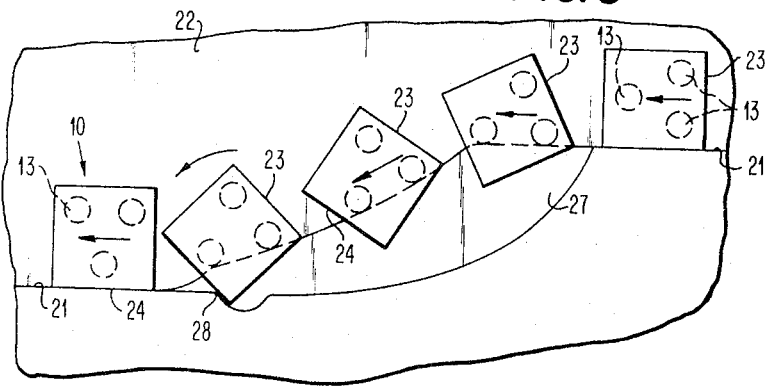
FIGURE 5 is an enlarged front view of one section of the track shown in FIGURES 2, 3 and 4 to illustrate the rotation of a selected chip.
Figure 4:
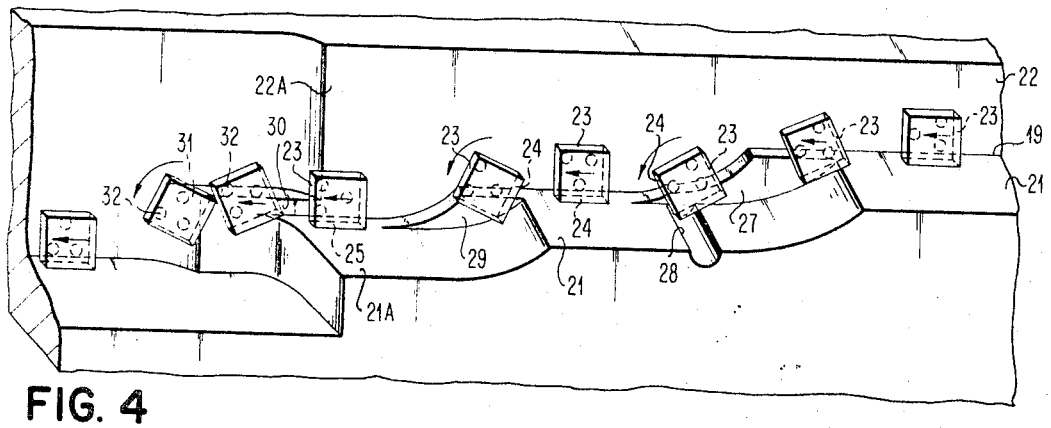
FIGURE 4 is the same view as FIGURES 2 and 3 with a chip in a third rotational orientation shown moving along the track.

With reference to FIGURES 4 and 5, chips in which the left leg of the ball triangle gravitationally engages ridge 27 have their edges so positioned that as they move along guide ridge 27, the top edge 24 of the chip pivotally engages abutment 28 and the forward motion of the chip rotates the chip to bring top edge 24 of the chip into gravitational engagement with track wall 21 along which the chip moves to be reengaged by guide ridge 29 of the second orientation station in an orientation wherein the right leg of the ball triangle is gravitationally engaged by the ridge. The chip has thus been rotated in the first station through one turn from its initial orientation wherein the left triangle leg engaged guide ridge 27.

The second orientation station rotates for one turn all chips requiring one counterclockwise turn to reach the preselected orientation. The chips engaged by ridge 29 in FIGURES 3 and 4 require one turn. These chips pass from ridge 29 onto the track 19 with the right chip edge 25 gravitationally engaging track wall section 21A and the chip balls gravitationally engaging track wall 22A. As the chip proceeds along the track, walls 21A and 22A fall away out of gravitational engagement with the chip leaving guide ridge 30 which gravitationally engages the chip ball forming the left leg of the triangle as shown. As the chip reaches end 31 of ridge 30, ball 32 is first released from the ridge causing the chip to tumble into the preselected orientation with the triangle base and the bottom edge of the chip in the lowermost position.

With respect to a chip which has already had the preselected rotational orientation when it enters the second station, as shown in FIGURE 2, the ridge 30 engages the apex ball of the triangle when walls 21A and 22A fall away from gravitational engagement with the chip. The chip is then dropped from ridge end 31 in its same preselected orientation.

Articles having configurations of projections other than those described with respect to the above preferred embodiment may be rotationally oriented by apparatus covered by this invention. Articles having a group of projections from a planar face in which the projections form a convex polygon of $n$ sides may be rotationally oriented to a preselected orientation in the plane of the face if each of the sides has a disposition with respect to the surface edge different from that of any other side. For example, apparatus according to the present invention could be used to orient an article with a group of projections in a rectangular configuration extending from a pentagonal substrate if each of the sides of the inner rectangle formed by the projections had a disposition with respect to the adjacent edge of the pentagonal substrate different from that of any other side of the rectangle. In an article of such characteristics, apparatus with $(n-1)$ or three orientation stations or orienting guide means in series along the article path means could be utilized to orient the article. Each of the three stations would rotate for one turn, as previously defined, only articles requiring a number of turns equal to the number of remaining stations to reach the preselected rotational orientation.

The individual selective turns at the orientation stations may be accomplished by apparatus employing the combination of a guide ridge and an associated abutment of the type shown in FIGURES 4 and 5. Assuming that the described pentagonal substrate having the rectangular projection configuration is engaged by guide ridge 27 so that when each of the four rectangle sides gravitationally engaged by ridge 27, a different substrate edge configuration will be presented to abutment 28. The arrangement of the abutment and the guide ridge at a given station may be such that the only articles engaged by the abutment and turned will be those presenting to the abutment an edge configuration representing a rotational orientation deviated from the preselected orientation by the number of turns requisite for the particular station.

Apparatus of the present invention may also be used in the alignment of articles or chips having a group of at least three projections from a planar surface thereof in which the peripheral projections of the group form a convex polygon of $n$ sides, one of which sides has a disposition with respect to the edge of the planar surface unique from that of any other side. The article may be considered to have $n$ rotational orientations in the plane of the surface. In each of the orientations, a different side of the polygon would be lowermost with the side having of the unique disposition being lowermost in the preselected orientation. With such an article $(n-1)$ guide means in series along the track would still be used to gravitationally engage the peripheral projections of the articles and said guide means would be adapted to rotate articles for one turn as described hereinabove. However, each of the guide means would only turn articles not having the preselected orientation.

What is claimed is:

1. In vibratory article feeding apparatus including a vibratory feeder bowl having a supply source of randomly arranged articles, an inclined elevating track extending from said source around the bowl wall and means for vibrating the bowl to cause the articles to move up the track, the improvement which comprises means for orienting in a preselected rotational orientation an article having a group of at least three projections from one substantially planar surface thereof, the peripheral projections of said group forming a convex polygon of $n$ sides each of said sides having a disposition with respect to the edge of said surface different from that of any other side, said article having $n$ orientations in the plane of said surface, a different side being lowermost in each of said orientations, comprising:

means for disposing the articles with their projection bearing surfaces facing the track and $(n-1)$ guide means in series along said track for gravitationally engaging the peripheral projections, each of said guide means utilizing the forward motion of the article and gravity to rotate the article in the plane of said surface for one turn to an orientation wherein the next side is lowermost and each of said guide means acting to rotate only articles requiring a number of turns to the preselected orientation equal to the number of guide means remaining in the article path along the track.

2. The apparatus of claim 1 wherein the peripheral projections of said group form a triangle and there are two of said guide means on said track.

3. The apparatus of claim 2 wherein the article is formed of projections on a flat base.

4. The apparatus of claim 1 wherein the articles move up the track in a counter-clockwise sense and are oriented by being turned in a counter-clockwise sense.

5. In vibratory article feeding apparatus including a vibratory feeder bowl having a supply source of randomly arranged articles, an inclined elevating track extending from said source around the bowl ball and means for vibrating the bowl to cause the articles to move up the track, the improvement which comprises means for orienting in a preselected rotational orientation a rectangular semiconductor chip having three contact projections extending from a face thereon in a triangular arrangement with the triangle base adjacent the bottom edge of the chip and the apex of the triangle adjacent the top edge of the chip whereby in said preselected orientation, the triangle base is the lowermost of the triangle sides, comprising:

means for disposing the chips into a projections-down engagement with the track, and two guide means in series along the track for gravitationally contacting the chip projections, each of said guide means utilizing the forward motion of the chip and gravity to rotate the chip in the plane of the face for one turn to an orientation wherein the next triangle side is lowermost, the first of said guide means in the path of the chip along the track rotating only chips requiring two turns to bring triangle base into the lowermost position and the second guide means rotating only chips requiring one turn to bring the triangle base into the lowermost position.

6. In vibratory article feeding apparatus including a vibratory feeder bowl having a supply source of randomly oriented articles, an inclined elevating track extending from said source around the bowl wall and means for vibrating the bowl to cause the articles to move up the track, the improvement which comprises means for rotational orientation of articles with a convex polygonal surface having a plurality of projections in a non-uniform disposition with respect to the edge of the surface comprising means for feeding each of the articles to the track with its projection bearing surface facing the track and in a random rotational orientation with one side of the polygonal surface edge gravitationally engaging the track and a guide ridge on said track for gravitationally contacting at least two of the projections on each article which are closest to the ridge and guiding the article past an abutment positioned proximate said track, said abutment pivotally engaging surface edges of only articles in which the projections contacted by the ridge have a preselected disposition with respect to polygonal surface edge whereby the motion of the article acts to rotate the article in the plane of the surface to an orientation wherein the next succeeding side of the polygon engages the track.

7. The apparatus of claim 6 wherein said surface is rectangular and said projections are disposed in a triangular configuration.

8. The apparatus of claim 7 wherein the projections forming any one of the three triangle sides are gravitationally contacted by the guide ridge and said abutment pivotally engages the surface edge only when a preselected triangle side is in contact with the ridge.

9. The apparatus of claim 7 wherein the surface is on a flat rectangular base.

10. In vibratory article feeding apparatus including a vibratory feeder bowl having a supply source of randomly arranged articles, an inclined elevating track extending from said source around the bowl wall and means for vibrating the bowl to cause the articles to move up the track, the improvement which comprises means for the rotational orientation of rectangular semiconductor chips having three contact projections extending from a surface thereon in a triangular arrangement with the triangle base adjacent the bottom edge of the chip and the apex of the triangle adjacent the top edge of the chip comprising:

means for feeding each of the chips to the track in a projections-down disposition and in a random rotational orientation, with one edge of the chip gravitationally engaging the track and a guide ridge on said track for gravitationally contacting the projections forming the triangle side closest to the ridge and guiding the chip past an abutment positioned proximate said track, said abutment pivotally engaging edges of only chips in which the projections forming a preselected triangle side are in contact with the ridge whereby the motion of the chip acts to rotate the engaged chip in the plane of said surface about the pivotal abutment to an orientation wherein the next succeding edge of the chip engages the track.

11. The apparatus of claim 10 wherein the chips move up the track in a counter-clockwise sense and are oriented by being rotated in a counter-clockwise sense.

12. The apparatus of claim 11 wherein the abutment pivotally engages only chips in which the projections forming the left leg of the triangle are in contact with the ridge.

13. The apparatus of claim 10 wherein the chips being orientated have a triangular arrangement of projections with the triangle base substantially parallel to the bottom edge of the chip, the apex of the triangle adjacent to the top edge of the chip and a pair of legs from apex to base respectively adjacent the side edges of the chip.

14. The apparatus of claim 5 wherein the chips are disposed on the track with one edge of each chip gravitationally engaging the track and
one of said guide means comprises a guide ridge on said track for gravitationally contacting the projections forming the triangle side closest to the ridge and guiding the chip past an abutment positioned proximate said track, said abutment pivotally engaging only chips in which the projections forming a selected leg of the triangle are in contact with the ridge whereby the motion of the chip acts to rotate the engaged chip about the pivotal abutment in the plane of the face to an orientation wherein the next succeeding edge of the chip engages the track.

15. The apparatus of claim 14 wherein the chips move up the track in a counter-clockwise sense and are oriented by being rotated in a counter-clockwise sense.

16. The apparatus of claim 15 wherein the abutment pivotally engages only chips in which the projections forming the left leg of the triangle are in contact with the ridge.

17. In vibratory article feeding apparatus including a vibratory feeder bowl having a supply source of randomly arranged articles, an inclined elevating track extending from said source around the bowl wall and means for vibrating the bowl to cause the articles to move up the track in a counter-clockwise sense,
the improvement which comprises means for orienting in a preselected rotational orientation a rectangular semiconductor chip having three ball contacts extending from a face thereon in a triangular arrangement with the triangle base adjacent the bottom edge of the chip, the apex of the triangle adjacent the top edge of the chip and a pair of triangle legs respective adjacent the right and left chip edges, whereby in said preselected orientation, the bottom edge is the lowermost of the chip edges comprising:
means for feeding the chips to the track in a balls-down and random rotational orientation,
a first guide ridge along the track on the track for gravitationally contacting the balls forming the triangle side closest to the ridge and guiding the chip past an abutment positioned proximate said track, said abutment being so positioned that chips having either the base or the right leg of the ball triangle contacting the ridge are guided over the abutment and leave the ridge with either the bottom edge or the right edge of the respective chip lowermost and in gravitational engagement with the track while a chip having the left leg of the ball triangle contacting the ridge is pivotly engaged on its edge by said abutment whereby the motion of the chip up the track acts to rotate the chip about the pivotal abutment in a counter-clockwise sense to an orientation wherein the chip leaves the ridge with its top edge lowermost and in gravitational engagement with the track,
a second guide ridge along the track for gravitationally contacting the balls of the moving chips but only rotating chips with top edges lowermost through a 90° counter-clockwise tumble to bring the right edge of each rotated chip into the lowermost position and in gravitational engagement with the track, and
a third guide ridge along the track for gravitationally contacting the balls of the moving chips and only rotating chips with right edges lowermost through a 90° counter-clockwise tumble to bring each chip into the preselected orientation with the bottom edge lowermost and in gravitational engagement with the track.

18. The apparatus of claim 17 wherein at least one of the balls contacted by the first guide ridge is the lowermost ball on the chip.

19. The apparatus of claim 17 wherein at least one of the balls contacted by the second guide ridge is the lowermost ball on the chip.

20. The apparatus of claim 17 wherein at least one of the balls contacted by the third guide ridge is the uppermost ball on the chip.

21. The apparatus of claim 17 wherein said third guide ridge contacts the balls forming the left leg of the triangle at the surfaces of said balls facing away from the left edge of the chip.

22. In vibratory article feeding apparatus including a vibratory feeder bowl having a supply source of randomly arranged articles, an inclined elevating track extending from said source around the bowl wall and means for vibrating the bowl to cause the articles to move up the track,
the improvement which comprises means for orienting in a preselected rotational orientation an article having a group of at least three projections from one substantially planar surface thereof, the peripheral projections of said group forming a convex polygon of $n$ sides, said article having $n$ orientations in the plane of said surface, a different side being lowermost in each of said orientations and the side which is lowermost in the preselected orientation having a disposition with respect to the edge of said surface different from that of any other side, said orienting means comprising:
means for disposing the articles with their projection bearing surfaces in facing the track and
$(n-1)$ guide means in series along said track for gravitationally engaging the peripheral projections, each of said guide means utilizing the forward motion of the article and gravity to rotate the article in the plane of said surface for one turn to an orientation wherein the next side is lowermost and each of said guide means acting to rotate only articles not having the preselected orientation.

References Cited
UNITED STATES PATENTS 2,725,971   12/1955   Clark _____ 198—33
2,807,350   9/1957    Rayburn _____ 198—33

EDWARD A. SROKA, *Primary Examiner.*